United States Patent Office 3,075,000
Patented Jan. 22, 1963

3,075,000
OXIDATION OF ALDEHYDES
Charles E. Castro, Riverside, and Jay K. Kochi, Berkeley, Calif., assignors to Shell Oil Company, New York, N.Y., a corporation of Delaware
No Drawing. Filed Aug. 21, 1961, Ser. No. 132,564
10 Claims. (Cl. 260—486)

This invention relates to the oxidation of alpha,beta-ethylenic aldehydes by means of free radicals. It deals with a new method for carrying out such oxidations to produce alpha,beta-ethylenic carboxylic acids and/or derivatives thereof.

The predominant path of reaction of free radicals with alpha,beta-ethylenic aldehydes at low temperatures in the gas phase, that is, below about 350° C., and in solution, as heretofore carried out, is addition of the free radical at the ethylenic double bond of the aldehyde. It has now been discovered, however, that by the use of oxy free radicals under properly controlled conditions, the course of the reaction can be dramatically changed so that addition at the double bond is substantially suppressed and instead the chief reaction is abstraction of the aldehydic hydrogen atom by the free radical. In this way, alpha,beta-ethylenic acyl free radicals can be produced. The reaction can be represented by the general equation:

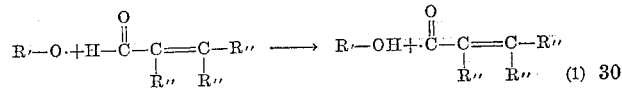

where $R'\text{—}O\cdot$ represents the oxy free radical used as the hydrogen abstraction agent and each $R''$ represents a hydrogen atom or an organic radical having its free bond linked to a carbon atom or any two $R''$'s together represent a divalent organic radical in which the two free bonds are each linked to a different carbon atom.

Acyl free radicals such as are formed according to the foregoing equation normally decompose rapidly into carbon monoxide and vinyl free radicals. In order to prevent this reaction which would greatly reduce the efficiency of the new process, the abstraction of aldehydic hydrogen from the starting alpha,beta-ethylenic aldehyde by the chosen oxy free radical is carried out in the presence of a special type of reactant which transforms the intermediate alpha,beta-ethylenic acyl radical before it undergoes this decomposition. This reactant can, for example, be a hypohalite or a solution of cupric salt, or the like.

Where a hypohalite is used for reaction with the initially formed alpha,beta-ethylenic acyl free radical the product will be an alpha,beta-ethylenic carboxylic acid halide in which the halogen is the same as that of the hypohalite and/or an ester such as is formed by reaction of that carboxylic acid halide with the alcohol corresponding to the starting hypohalite or with another alcohol if such is also present. The hypohalite can function both as the reactant for the intermediate alpha,beta-ethylenic acyl free radical and as the source of the oxy free radical required for abstraction of aldehydic hydrogen from the starting alpha,beta-ethylenic aldehyde since photolysis of the hypohalite, for example, will produce the required oxy free radicals. The reactions involved in this modification of the invention can be represented by the following general equations where the use of a tertiary hypohalite is illustrated because this type of hypohalite is especially advantageous in the new process due to its greater stability than other types of hypohalites under the reaction conditions preferably used.

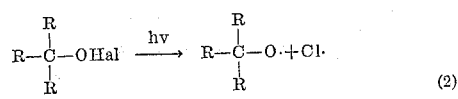

(2)

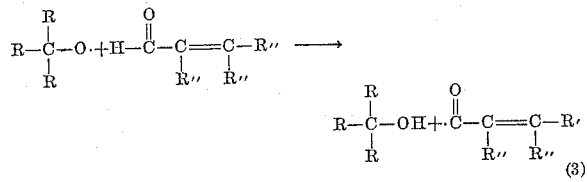

(3)

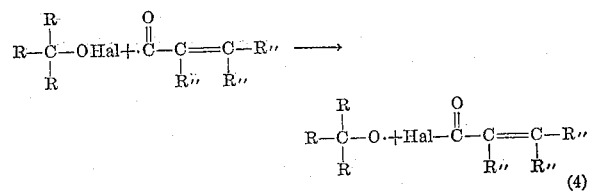

(4)

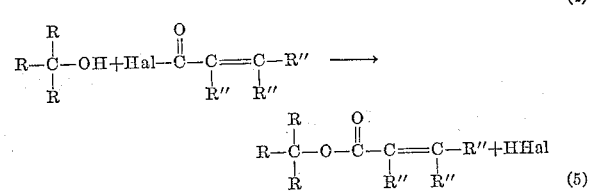

(5)

Here, R represents an organic radical having its free bond linked to a carbon atom or any two of the R's together represent a divalent organic radical in which the two free bonds are each linked to a different carbon atom. $R''$ has the same significance as in the previously given equation. A specific illustration of this method of reaction is the photolysis of a solution in carbon tetrachloride of beta-methylcrotonaldehyde and 1-methylcyclohexylhypobromite to produce beta-methylcrotonic acid bromide and 1-methylcyclohexyl beta-methylcrotonate according to the equations:

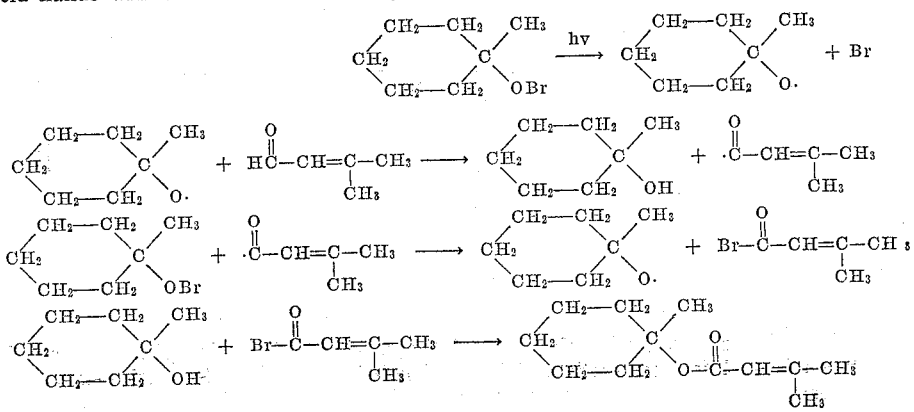

Stoichiometric proportions of tertiary hypohalite and alpha,beta-ethylenic aldehyde can be used in this modification of the invention, but an excess of either reactant can also be employed, mole ratios in the range of about 0.2 to about 1 mole of hypochlorite per mole of aldehyde being particularly suitable although a ratio of about 1:1 is preferred. The reaction is conveniently conducted at about room temperature but higher or lower temperatures in the range of about $-10°$ C. to about $50°$ C. can be employed satisfactorily and, more preferably, temperatures of about $-5°$ C. to about $25°$ C. are used. Any solvent which does not absorb excessive amounts of the ultraviolet radiation used for the photolysis can be employed as diluent for the reaction mixture. Solvents which are inert under the reaction conditions are preferred. Halohydrocarbons such as carbon tetrachloride, chloroform, etc. or hydrocarbons such as tert. butyl benzene and the like are suitable, for example.

In the modification of the invention in which a solution of cupric salt is used for reaction with the initially formed alpha,beta-ethylenic acyl free radical, the alpha,beta-ethylenic acyl radical is first oxidized to the alpha,beta-ethylenic carbonium ion by the cupric ions in accordance with the equation:

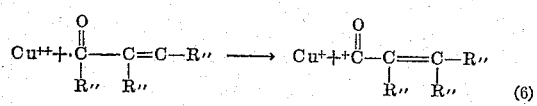

The resulting acyl carbonium ions react either with the anion of the cupric salt used or with the anion of a protic solvent if such a solvent is present.

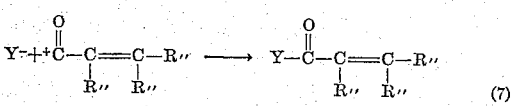

Here $Y^-$ is the anion of the cupric salt used or anion of the protic solvent employed. The overall reaction can be represented by the equation:

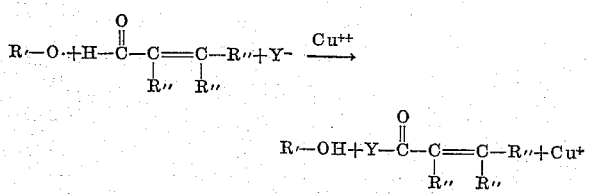

The nature of the alpha,beta-ethylenic carboxylic acid compound which is formed will thus depend upon the particular anion of the protic solvent or of the cupric salt which is used for the reaction. When anions of a carboxylic acid are present either because a cupric salt of such acid has been employed or because the acid has been used as the protic solvent, the product will be the mixed anhydride of that acid and of the alpha,beta-ethylenic carboxylic acid corresponding to the starting aldehyde. Thus when cupric acetate is the cupric salt or acetic acid is used as solvent the product will be an anhydride of the formula

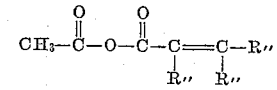

Similarly when the reaction is conducted in an alcoholic medium, i.e., the protic solvent is an alcohol R—OH, the product will be the carboxylic acid ester corresponding to the starting aldehyde but with an ester group derived from said alcohol in place of the aldehyde group. When halide anions are present either thru use of cupric halide as the cupric salt or when a hydrogen halide is the protic solvent used, the product will be the corresponding carboxylic acid halide as in the case where a hypochlorite is used for reaction with the alpha,beta-ethylenic acyl free radical as shown in Equation 4 and there can be more or less ester formation as well as a result of reaction of the carboxylic acid halide with alcohol present. This alcohol can be added alcohol or that present as a by-product of the abstraction of hydrogen from the starting aldehyde by the oxy free radical as shown in Equation 1.

Any alpha,beta-ethylenic aldehyde can be oxidized successfully by the process of the invention. However, there are special advantages in reacting aliphatic aldehydes in which the $R_{''}$'s of the formulae shown in Equation 1 represent hydrogen or a lower alkyl radical of 1 to 5 carbon atoms. However, $R_{''}$ in the foregoing formulae can be other organic radicals of the previously indicated kind, preferably hydrocarbon radicals having 1 to 10 carbon atoms each, and also any two of these can be a divalent hydrocarbon radical, for instance, an alkylene radical, preferably of about 3 to 10 carbon atoms, most advantageously a saturated divalent hydrocarbon radical having a chain of 3 to 5 carbon atoms between the free bonds of the radical. Thus, for example, when tertiary amyloxy free radicals,

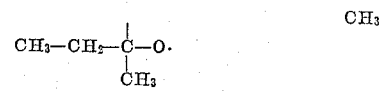

are generated in an aqueous medium containing cupric ions and an aliphatic aldehyde such as alpha-methylcrotonaldehyde, the product is alpha-methylcrotonic acid formed according to the equations:

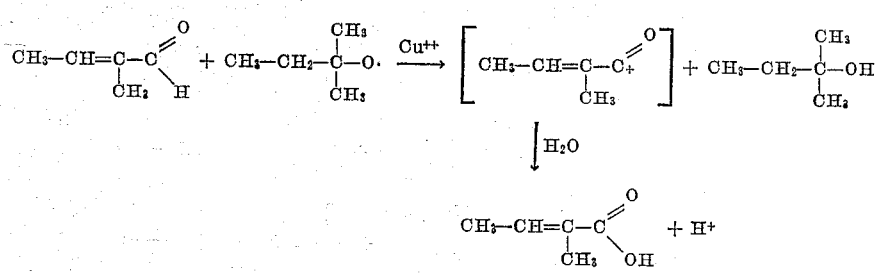

Alicyclic alpha,beta-ethylenic aldehydes are similarly oxidized, 4-methyl-$\Delta^1$-tetrahydrobenzaldehyde, for example, gives isopropyl 4-methyl-$\Delta^1$-tetrahydrobenzoate when the reaction is carried out in isopropanol solution as shown by the following equations:

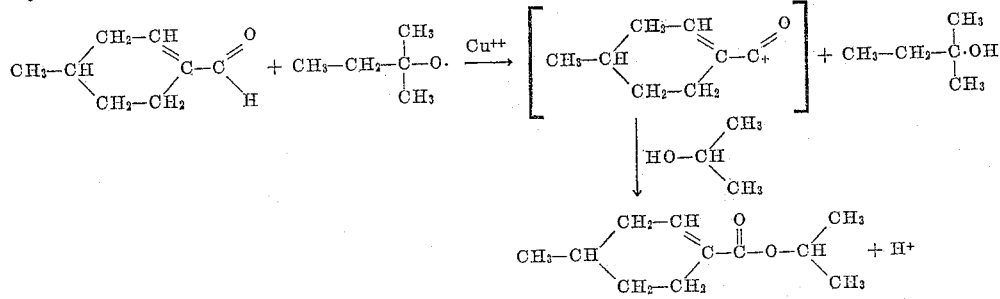

Exemplary of the reactions of alpha,beta-ethylenic aromatic aldehydes is the conversion of 3,4-dihydro-1-naphthaldehyde to 3,4-dihydro-1-naphthoic acid when the reaction is carried out in the presence of water, for instance, as illustrated by the equations:

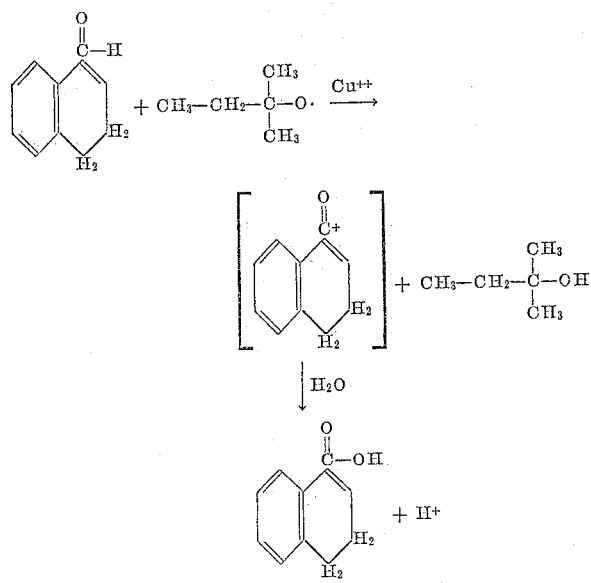

The oxy free radical which is essential for the new reaction can be generated in any suitable way, there being a number of known methods for generating such radicals which can be employed successfully in the new process. One particularly advantageous source of these free radicals is the corresponding organic peroxides, particularly those having a tertiary carbon atom to which a peroxide or hydroperoxide group is directly attached. Such peroxides can be decomposed by pyrolysis, photolysis or reaction with a redox reducing agent to produce tertiary oxy radicals for use in the process of the invention. The reaction in the case of a tertiary hydroperoxide is represented by the equation:

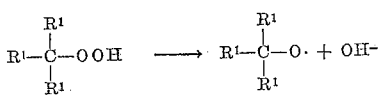

where each $R^1$ is an organic radical having its free bond attached to a carbon atom as in the equation previously given for the reaction of the invention with these tertiary oxy free radicals. Thermal decomposition of peroxides having the required structure can be effected by heating at about 75° to about 220° C. The pyrolysis is preferably carried out in liquid phase in the presence of the alpha,beta-ethylenic aldehyde which is to be oxidized and of the reactive medium required for conversion of the resulting alpha,beta-ethylenic acyl free radical to the desired product, acid, ester, acid chloride, amide, or anhydride.

For generation of the tertiary oxy free radicals by photolysis of an organic tertiary peroxide or hydroperoxide one can advantageously use exposure to ultraviolet light following the procedure described in "Techniques of Organic Chemistry," edited by A. Weissberger, vol. II, pages 257 ff. In this modification of the invention, the liquid reaction mixture will contain the alpha,beta-ethylenic aldehyde to be oxidized, the tertiary peroxy compound chosen as source of the tertiary oxy free radical oxidizing agent and the water, alcohol, halogen compound or amine to be reacted with the alpha,beta-ethylenic acyl free radical intermediate which is produced. This mixture is conducted, preferably at about room temperature although temperatures of about −15° C. to about 200° C. can be employed, thru a quartz reaction tube exposed to radiation of about 2000 to about 5000 Angstrom units.

Redox reaction of the indicated tertiary peroxides in the presence of cupric ions is an especially useful method for generating tertiary oxy free radicals in the process of the invention. This method of reaction is conveniently carried out by adding the tertiary peroxide or hydroperoxide or mixture thereof together with a redox reducing agent to a solution of the alpha,beta-ethylenic aldehyde in the chosen reactive medium, for example, water or aqueous alcohol, etc., containing cupric ions. Ferrous ion is a particularly useful redox reducing agent and can be introduced by adding ferrous sulfate or other soluble ferrous salt to the reaction mixture. However, any of the many other known redox reducing agents can be used instead of or together with the ferrous ions in the new process. Suitable examples of such reducing agents include the lower valence form of ions of other heavy metals which are capable of existence in several valence states such as cobaltous, manganous, cuprous, titanous, chromous, vanadous and like ions, as well as sodium bisulfite, 1-ascorbic acid, sodium formaldehyde sulfoxylate, the reducing sugars, etc. The reducing agent or mixture of reducing agents used is employed in an amount equivalent to or, preferably, in a small excess of, for instance, up to about 10% excess over, the stoichiometric requirement for reduction of the tertiary peroxide compound being used as a source of the tertiary oxy free radicals. Instead of a stoichiometric amount of ferrous ions, one can, if desired, use in the process a trace of a multivalent metal, preferably ferrous or ferric ion together with another of the aforementioned other reducing agents in stoichiometric amount which will serve to reduce the ferric ion to ferrous ion as fast as the ferric ion is formed. Ferrous ion is the preferred promoter in this type of operation and is advantageously used in amounts of about 0.25 to about 1 equivalent per mole of peroxide or hydroperoxide employed. In either case, a temperature of about −20° C. to about 150° C. can be used although it is generally preferable to employ temperatures of about 0° to about +20° C. in order to minimize loss of aldehyde either through volatilization or side reaction. The time of reaction is not critical in this mode of operation and times in the range of about 5 to about 240 minutes are usually satisfactory under the foregoing conditions. It is usually advantageous to carry out the reaction in an acidic environment, preferably achieved by adding a small amount of sulfuric or hydrochloric or other strong polybasic acid to the reaction mixture. The cupric ions necessary in this modification of the invention can be derived from any source. Cupric salts soluble in the reaction mixture can be used conveniently. Most preferably soluble salts of polybasic sulfate, cupric perchlorate and the like are used, but one can also use cupric salts of monobasic inorganic acids, for instance, cupric nitrate and cupric chloride to form chloro-substituted products under some conditions. Suitable organic cupric salts for use in the process include cupric benzenesulfonate, cupric methanesulfonate, and the like, for example.

One can use less than the stoichiometric amount of cupric ion required for reaction with the acyl free radical in this modification of the invention since the cuprous ion formed in the process can be reoxidized to the cupric state in the reaction mixture. Thus when using ferrous ion as the redox reducing agent, the ferric ions into which it is converted can oxidize the cuprous ions. Desirable, however, at least about 0.01 equivalent of cupric copper should be present in the reaction mixture per mole of free radical precursor used. Larger amounts can be employed successfully but there is usually no advantage in amounts greater than about 2 equivalents per mole of precursor of the alpha,beta-ethylenic acyl free radicals to be reacted therewith. Most advantageously the proportion of cupric ion is between about 0.1 and about 1.0 equivalent per mole of free radical precursor employed in the reaction.

In all of these methods of generating tertiary oxy free radicals from tertiary peroxides or hydroperoxides, it is advantageous to operate with a reaction mixture containing at least the stoichiometric amount of alpha,beta-ethylenic aldehyde for reaction with the tertiary oxy free radical produced and usually it is more advantageous to use an excess of such aldehyde. Mole ratios of alpha-beta-ethylenic aldehyde to the tertiary peroxide and/or hydroperoxide used as source of the tertiary oxy free radicals in the range of about 5:1 to about 1:1 are suitable and more preferably a ratio of about 1:1 is used. It is also desirable that the reaction be carried out in a medium containing an excess of the compound with which the intermediate alpha,beta-ethylenic acyl radical is to be reacted, that is to say, water, alcohol, halogen compound or ammonia or amine. Proportions of about 10:1 to about 2:1 moles of the chosen reactive compound or mixture thereof per mole of alpha,beta-ethylenic aldehyde are suitable, it being preferred to use mole ratios of about 5:1 to about 3:1.

Another type of oxy free radical which is useful as aldehydic hydrogen abstracting agent in the new process is the hydroxy free radical. These can be generated in the reaction mixture by any of the known methods. One especially useful method is the reaction of hydrogen peroxide and ferrous ion by the Haber-Weiss mechanism described in Chemical Reviews, vol. 50, page 375 (1952). This reaction takes place according to the equation:

The resulting hydroxyl free radicals asbstract aldehydic hydrogen from the alpha,beta-ethylenic aldehyde present:

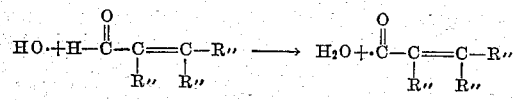

The alpha,beta-ethylenic acyl free radical is then oxidized by cupric ion and the resulting alpha,beta-ethylenic acyl carbonium ion then reacts with the protic solvent as previously described. The conditions of reaction in this modification of the invention can be the same as far as temperature, time and proportions of reactants are concerned, as when using the previously described organic oxy free radicals as the hydrogen abstracting agent.

All of these modifications of the invention can be carried out in different ways using batch, intermittent or continuous methods of reaction with or without solvents or diluents such as those previously mentioned in connection with the use of organic hypohalites as the source of the oxy free radicals employed for hydrogen abstraction. As previously indicated the alpha,beta-ethylenic carboxylic acid compound which is produced can be further reacted in the reaction mixture instead of being recovered as such. Recovery of product can be carried out in any suitable method using solvent extraction or distillation or other known methods.

The invention is further illustrated by the following examples showing typical applications of the new process.

EXAMPLE I

Acrylic Acid Chloride Production

In a one-liter three-necked flask equipped with stirrer, thermometer, and calcium chloride tube was placed 16.7 ml. acrolein (0.25 mole), 500 ml. carbon tetrachloride and 27.0 g. (0.25 mole) t-butyl hypochlorite. The flask was placed in an ice-water bath and irradiated with a 150 watt photo flood light. The solution gave no KI test (all hypochlorite was consumed) after 3½ hrs. irradiation at 15–30° C. The solution was made up to 557 ml. in a graduate cylinder. A 2 ml. aliquot required 11.50 ml. of 0.0984 N sodium hydroxide for neutralization (0.32 eq. for the total solution). Another 2 ml. aliquot was heated at 95° C. for 1 hr. with 20 ml. of water and excess sodium hydroxide (.0984 N). Back titration with hydrochloric acid showed that 0.49 eq. of base would be consumed by the total volume of solution. The yield of acrylyl chloride is thus 61% with the combined yield of acrylyl chloride and tert. butyl acrylate with a small amount of beta-chloro-derivatives resulting from addition of hydrogen chloride to the acrylic products being quantitative.

A portion (262 ml.) of the reaction product was treated with excess aniline (0.25 mole in 50 ml. CCl₄) with cooling (5° C.). The anilinium chloride was filtered off and the red-orange solution was washed twice with water, four times with 6 N HCl, twice with saturated sodium bicarbonate, and once with water. The solution was dried over sodium sulfate and concentrated on the steam bath in vacuo. The crude anilide residue weighed 4.5 grams corresponding to a 27% yield of acrylanilide which was recrystallized from hot water providing colorless crystals melting at 104° C. (literature melting point 104° C.)

EXAMPLE II

Acrylic Acid Production

In a similar run, except that after reaction was complete, the product solution was shaken four times with water, the aqueous solution was saturated with ammonium sulfate and extracted four times with ether. The ether extracts and the carbon tetrachloride solution were mixed and dried over sodium sulfate, and finally, concentrated and distilled in vacuo. (All distillations were accomplished under N₂ and the presence of hydroquinone.) Thereby was obtained 16 g. of acrylic acid (47% yield), b.p. 42–49°/5 mm. Its infrared spectrum was identical with the spectrum of authentic acrylic acid

EXAMPLE III

Tert. Butyl Acrylate Production

A 500 ml. flask fitted with a thermometer, and a condenser connected to a CaCl₂ tube was charged with 22 g. t-butyl hypochlorite (0.202 mole), 400 ml. carbon tetrachloride, 22.7 g. acrolein (0.404 mole), and 21 g. anhydrous sodium carbonate (0.20 mole). The flask was thermostated at 20–22° C. and irradiated with three 200 watt light bulbs for 23 hours. Two of the bulbs were immersed in the bath and one was without. The faintly yellow solution obtained in this manner gave a negative KI test. The inorganic salts were filtered off and the solution was distilled through a ½ meter helices packed column. The vacuum distillation was accomplished in a small vigreux.

| Fraction | B.p. | Wt. |
| --- | --- | --- |
| 1 | 54–63° C | 11.2. |
| 2 | 63–69.2 | 1.83. |
| 3 | 69.2–72 | 22.4. |
| 4 | 72–73 | 50.4. |
| 5 | 73–76 | 62.3. |
| 6 | 76 | 160.2. |
| 7 | 76–76.8 | 137.2. |
| 8 | 28–37°/134 mm | 35.3. |
| 9 | 38°/10 mm | 0.55. |
| Residue | (>150°/1 mm) | 2.36 g. (a black tar). |
| Cold Traps | | 38.3 g. |

Each fraction was subjected to vapor phase chromatographic analyses on a ¼ inch, 6 foot triethylene glycol on fire brick column which resolved carbon tetrachloride, t-butyl alcohol, and t-butyl acrylate from a mixture of acrolein and acetone. The blip corresponding to t-butyl acrylate was trapped ten times from the triethylene glycol column. It's IR spectrum was identical with the spectrum of authentic gaseous t-butyl acrylate.

EXAMPLE IV

Methacrylyl Chloride and Methacrylic Acid Production

In a one-liter three-neck flask equipped with stirrer, thermometer, and calcium chloride tube were placed 41.8 ml. (0.50 mole) methacrolein, 500 ml. t-butyl alcohol, and 54 g. (0.50 mole) t-butyl hypochlorite. The flask was immersed in an ice-water bath and irradiated with a 150 watt photo flood lamp for 1 hour at 15–20° C. with stirring. The faintly yellow solution gave only a feeble KI test. The solution was allowed to stand overnight at room temperature. The resulting lachrymatory solution (methacrylyl chloride) was poured into 1.5 liters of water to which ether was added. The whole was shaken occasionally during a 40 minute period and the upper phase was separated. The aqueous phase was saturated was ammonium chloride and extracted four times with ether. The ether extracts were combined and dried over sodium sulfate. The dried solution was concentrated on the water bath. Near the end of the distillation, it was noticed that some water was present in the kettle. The residue was redried over sodium sulfate and distilled in vacuo.

| Fraction | B.p. | Wt. |
| --- | --- | --- |
| 1 | 41–54°/11.5 mm | 2.85 g. ⎫ |
| 2 | 58–61°/11 mm | 16.76 ⎬ 20.5 g. |
| 3 | 61–63°/11 mm | 0.9 ⎭ |
| Residue | | 6.9 Tar. |

The infrared spectrum of each of the fractions 1–3 was identical with authentic methacrylic acid. Yield 20.5 g. (48%).

Reaction of cinnamyl aldehyde in the same way affords cinnamic acid in similar good yield.

EXAMPLE V

Acrylic Acid Production Using Tert. Butyl Hydroperoxide

In 50 ml. of water at 0° was dissolved 34 g.

$$CuCl_2 \cdot 2H_2O$$

20 ml. conc. HCl and 50 ml. acrolein. A solution of 67 g. $FeCl_2 \cdot 4H_2O$ in 50 ml. water was added simultaneously with 31 g. t-butyl hydroperoxide to the rapidly stirred reaction mixture maintained at 0–5° over 20 minutes. The green solution changes in color to a dark green brown. The clear homogeneous solution is then extracted with three 100 ml. portions of ether. The ethereal solution after drying with sodium sulfate and stabilized with hydroquinone was distilled. B.P. 140–142°; yield: 38% acrylic acid.

Substituting methacrolein and crotonaldehyde for the acrolein in this reaction yields methacrylic and crotonic acids, respectively, under the same conditions.

EXAMPLE VI

Acrylic Acid Production Using Hydrogen Peroxide

Acrolein (20 ml.), cupric chloride (25 g.) and 12.5 ml. conc. HCl were added to 200 ml. water at 0°. A solution of ferrous chloride (30 g. $FeCl_2 \cdot 4H_2O$ in 50 ml. water) was added at 0° to the stirred reaction mixture together with 17 ml. hydrogen peroxide (30%). The reaction mixture became darker but remained homogeneous. Less than 100 ml. gas ($O_2$) was evolved (by wet testmeter). After stirring 30 minutes at 0° the reaction mixture was vacuum distilled. The distillate was saturated with ammonium sulfate and extracted with ether four times. The ethereal extract after drying with sodium sulfate was distilled to yield acrylic acid (21%).

EXAMPLE VII

Methyl Acrylate Production Using Hydroperoxide

In a typical experiment, 26 g. $CuCl_2 \cdot 2H_2O$ was added to 80 ml. methanol. The chilled solution (0°) is swept with $N_2$ and 50 ml. acrolein and 18 g. t-butyl hydroperoxide quickly added. These were soon followed by the dropwise addition with rapid stirring of a solution of 12 g. $FeCl_2 \cdot 2H_2O$ in 60 ml. methanol. The addition takes 10 minutes; the temperature rises to 10–15°. The reaction is stirred for 20 minutes at 15° and then vacuum distilled. The distillate is diluted with water and dilute HCl and extracted with ether three times. The ethereal solution on drying with calcium chloride was distilled to give a 57% yield of methyl acrylate. An ester assay (by saponification) of the original crude methanolic distillate indicates the presence of a 71% yield of methyl acrylate.

It will be understood that the foregoing examples are merely illustrative and that the invention is not restricted thereby since it is broadly applicable to the conversion of alpha,beta-ethylenic aldehydes as a class to corresponding carboxylic acid compounds by generating an oxy free radical in the presence of said aldehyde and a tertiary hypohalite and/or solution of cupric ions in a medium which reacts with the alpha,beta-ethylenic acyl radical formed. Specific alpha,beta-ethylenic aldehydes, other than those used in the example, well adapted for conversion to the corresponding alpha,beta-ethylenic carboxylic acids and/or derivatives thereof by the new process, include aliphatic aldehydes, typical of which are alpha-ethylacrolein, alpha-isopropylacrolein, alpha-hexylacrolein, beta-ethylacrolein, beta-methylcrotonaldehyde, beta-cyclohexylacrolein, beta-methyl-beta-isopropylacrolein, alpha-methyl-beta,beta-diethylacrolein, geranial, alpha-isopropylcrotonaldehyde, and beta-allylacrolein. Representative alpha,beta-ethylenic aromatic aldehydes which can be similarly reacted are, for instance, alpha-methyl cinnamyl aldehyde, gamma-benzyl crotonaldehyde, beta-(para-chlorophenyl)acrolein, meta-nitrocinnamyl aldehyde, ortho-hydroxycinnamyl aldehyde, para-methoxycinnamyl aldehyde, piperonyl acrolein and ortho-nitrocinnamylidene-acetaldehyde. Other alpha,beta-ethylenic cyclic aldehydes which can be converted successfully to alpha,beta-ethylenic carboxylic acid compounds in the same way are, for example, $\Delta^1$- or beta-cyclocitral, $\Delta^1$-tetrahydrobenzaldehyde, 4-methyl-$\Delta^1$-tetrahydrobenzaldehyde and $\Delta^{1,4}$-dihydrobenzaldehyde. Heterocyclic alpha, beta-ethylenic aldehydes which can be similarly reacted include 4,5-dihydrofurfural, alpha-methyl furfural, 5,6-dihydro-1,2-pyran-3-carboxaldehyde, dihydrothiophenealdehyde, 1-benzoyl-5-formyl-1,2,2a,3-tetrahydrobenz(c,d)indole, and the like.

Organic hydroperoxides which can be used as the oxidizing agent instead of the hydroperoxides of the foregoing examples include, for instance: chloro-tertiary butyl hydroperoxide, paramenthane hydroperoxide, tertiary amyl hydroperoxide, lauryl hydroperoxide, benzyl hydroperoxide, cyclohexyl hydroperoxide, cyclohexene hydroperoxide, bromo-tertiary-butyl hydroperoxide, eicosyl hydroperoxide and 1,1-dichloromethylpropyl hydroperoxide. Hydroperoxides containing not more than about 20 carbon atoms are of the molecular size preferred for employment in the process of the invention.

A particularly suitable class of hydroperoxides, for employment in the process of the invention, consists of the tertiary hydrocarbon peroxides and their halogen-analogs containing one or more chlorine or bromine atoms. This class includes, for example, such substituted or unsubstituted tertiary alkyl hydroperoxides as tertiary butyl hydroperoxide, alpha,alpha-dimethylbenzyl hydroperoxide, chlorotertiary butyl hydroperoxide, 1-chloromethyl-1-bromomethylpropyl hydroperoxide as well as 1-methylcyclohexyl hydroperoxide. However, other hydroperoxides can also be used.

Examples of hypohalites which can be used in the process, instead of those previously given as examples, are, for instance, tertiary butyl hypobromite, tertiary amyl hypofluorite, tertiary amyl hypochlorite, alpha,alpha-dimethylbutyl hypochlorite, alpha,alpha-dimethylhexyl hypochlorite, 1-methylcyclohexyl hypochlorite, alpha,alpha-dimethyl benzyl hypochlorite, alpha,alpha-dimethyl octyl hypobromite, and the like. Preferred hypohalites are the unsubstituted, tertiary hypochlorites, hypofluorites and hypobromites of 4 to 10 carbon atoms per molecule which are free from non-aromatic multiple linkages between carbon atoms.

It will thus be seen that the invention is capable of considerable variation, not only in respect to the methods and conditions of operation for the new reactions but also in regard to the reactants which can be employed therein. Therefore it will be understood that the process is not limited to the examples which have been given for purposes of illustration only, nor by any theory proposed in explanation of the advantageous results which are attained.

We claim as our invention:

1. In a process for converting an alpha,beta-ethylenic aldehyde to an alpha,beta-ethylenic carboxylic acid compound, the improvement which comprises generating an oxy free radical in a solution of said aldehyde containing a reactant for the resulting alpha,beta-ethylenic acyl free radical chosen from the group consisting of tertiary hypohalites and cupric salts.

2. In a process for converting an alpha,beta-ethylenic aldehyde to the corresponding alpha,beta-ethylenic carboxylic acid halide, the improvement which comprises generating a tertiary oxy free radical in a solution of said aldehyde containing a tertiary hypohalite.

3. A process in accordance with claim 2 wherein the tertiary oxy free radical is generated by photolysis of the tertiary hypohalite.

4. A process for producing an alpha,beta-ethylenic carboxylic acid chloride which comprises exposing to ultraviolet light a solution of an alpha,beta-ethylenic aldehyde containing a tertiary alkyl hypochlorite at about −5° C. to about 25° C. until substantial photolysis of the hypochlorite to tertiary alkyl oxy free radicals effective in abstraction of aldehydic hydrogen from said aldehyde takes place with formation of alpha,beta-ethylenic acyl free radicals which react with said hypochlorite to form said acid chloride.

5. A process comprising exposing to ultraviolet light a solution of acrolein containing about 0.25 to about 1 mole of tertiary butyl hypochlorite per mole of acrolein at about 0° C. to about 25° C. for about 120 to about 30 minutes.

6. A process for converting an aldehyde of the formula

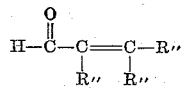

where each R,, represents a member of the group consisting of hydrogen and organic radicals of 1 to 5 carbon atoms linked to the carbon atoms shown by bonds attached to carbon and having as the only multiple linkages, aromatic double bonds, to the corresponding carboxylic acid compound

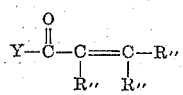

which comprises generating an oxy free radical in a solution of said aldehyde containing a cupric salt in which Y is the anion.

7. A process for producing an alpha,beta-ethylenic carboxylic acid from the corresponding alpha,beta-ethylenic unsubstituted aldehyde of 3 to 12 carbon atoms per molecule which comprises generating an oxy free radical in a solution of said aldehyde by redox reaction of a tertiary hydroperoxide of 4 to 12 carbon atoms in the presence of a cupric salt.

8. A process for producing an acrylic acid compound which comprises reacting acrolein with a tertiary alkyl hydroperoxide of 4 to 6 carbon atoms in an aqueous solution of ferrous and cupric ions at about 0° C. to about 25° C., the mole ratio of tert. alkyl hydroperoxide to acrolein being about 1:1 to about ¼:1 and there being present about 1 to about ¼ equivalent of ferrous ion and about ¼ to about 1/10 equivalent of cupric ion per mole of tertiary alkyl hydroperoxide.

9. A process in accordance with claim 8 wherein the reaction is carried out in alcoholic solution whereby the acrylate ester of the alcohol is produced.

10. A process in accordance with claim 8 wherein the reaction is carried out in the presence of acetate anions and a mixed anhydride of acrylic and acetic acids is produced.

References Cited in the file of this patent

UNITED STATES PATENTS

| | | |
|---|---|---|
| 2,744,928 | Smith et al. | May 8, 1956 |
| 2,744,929 | Smith et al. | May 8, 1956 |
| 3,013,068 | De La More et al. | Dec. 12, 1961 |